June 6, 1944.                S. B. BRODIE                2,350,720
                         RESERVOIR CONSTRUCTION
                          Filed Aug. 28, 1941
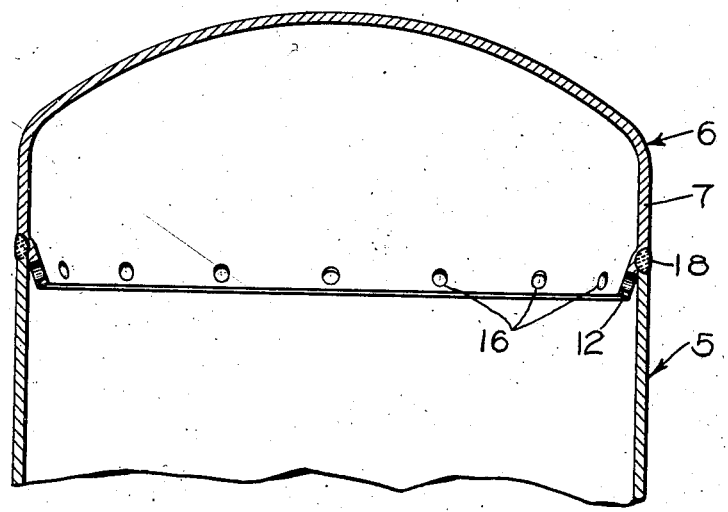
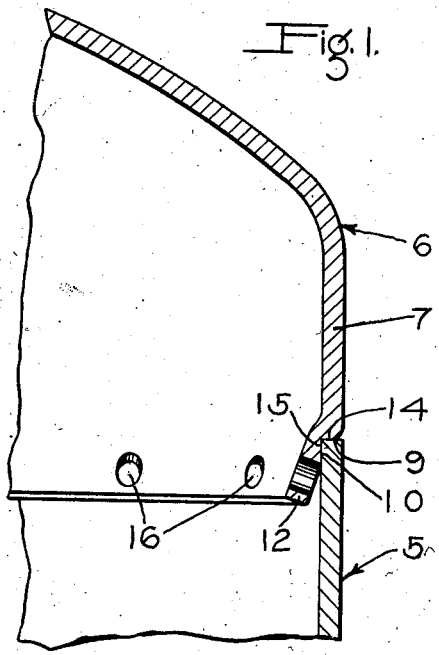
INVENTOR
STUART B. BRODIE
BY
ATTORNEY Patented June 6, 1944

2,350,720

UNITED STATES PATENT OFFICE 2,350,720

RESERVOIR CONSTRUCTION

Stuart B. Brodie, Wilmerding, Pa., assignor to The Westinghouse Air Brake Company, Wilmerding, Pa., a corporation of Pennsylvania Application August 28, 1941, Serial No. 408,573

3 Claims. (Cl. 220—67)

This invention relates to reservoir construction, and more particularly to a welded steel reservoir suitable for containing fluid under pressure.

In order to facilitate economical manufacture of steel reservoirs, it has been proposed to attach the circular reservoir heads to the cylindrical reservoir shells by means of butt welding. To meet certain engineering standards, such as requirements of the A. S. M. E. code, and to avoid the necessity for an internal weld, it has heretofore been the practice to attach an additional backing piece or steel strip inside the reservoir head, which backing strip has been designed to extend into the cylindrical shell and to cover the area to be welded.

It is one object of my invention to provide an improved reservoir construction in which the reservoir head is formed with an annular tapered or inswept portion, constituting a backing strip that is integral with the head, and which is designed to receive the cylindrical reservoir shell in a manner facilitating the assembly and butt welding of the two members.

Another object of the invention is to provide an improved steel reservoir assembly of the above type, in which the upset or inwardly tapered flange on the reservoir head is formed with a substantially right angular or square shoulder, against which the end of the cylindrical shell of the reservoir can be readily seated, after which the two members can be welded together with carbon arc welding equipment.

Still another object of the invention is to provide an improved reservoir constructed in the manner just explained, and having a plurality of orifices formed in the tapered backing strip portion to prevent collection of moisture in the annular groove existing between the strip and the wall of the reservoir.

Other objects and advantages of the invention will appear in the following more detailed description thereof, taken in connection with the accompanying drawing, in which Fig. 1 is a fragmentary sectional view illustrating the head and shell portions of a reservoir constructed in accordance with the invention, and Fig. 2 is a similar view, somewhat reduced in detail, showing the assembled and welded shell and head portions of the reservoir.

A steel reservoir constructed in accordance with my invention initially comprises three sections i. e., a cylindrical shell section, and two similar head sections designed to be attached to the ends of the shell section. As already explained it is necessary, in accordance with approved engineering standards, that the junction of each head section with the shell section be backed up or reinforced by a backing strip of steel, the sections being butt-welded together by a suitable arc welding process applied exteriorly of the reservoir. The invention is illustrated in the accompanying drawing in fragmentary views showing my improved construction as employed in welding a reservoir shell section to a head section having the necessary backing strip formed integrally thereon, it being understood that the same features may be embodied in a complete reservoir in actual practice.

Referring to the drawing, there is shown in Fig. 1 a reservoir comprising a cylindrical shell section 5 and a dome-shaped head section 6, which has a cylindrical skirt portion 7 having the same diameter as that of the shell section 5. The end of the cylindrical shell section 5 adjacent the head section 6 is square in cross section, providing a flat annular edge surface 9 disposed in right angular relation with respect to the circular inner surface 10 of the section.

According to the invention, the required backing strip is provided as an integral portion of the reservoir head section, and as best shown in Fig. 1 comprises an inwardly bent annular flange 12, which is formed on the skirt portion 7. The flange 12 is inclined inwardly from a flat annular shoulder 14 which is pressed into the outer side thereof and is designed to abut the end 9 of the shell section 5. It will be noted that the diameter of the annular shoulder 14 is substantially the same as that of the skirt portion 7 and of the shell section 5.

The portion of the flange 12 extending beyond the exterior shoulder 12 is so formed as to provide an annular outer face 15, which is disposed in right angular relation with respect to the shoulder as viewed in section in Fig. 1. A plurality of apertures 16 are punched or otherwise formed in the portion of the flange 12 which extends into the reservoir and in spaced relation with respect to the inner wall of the shell section 5, when that section and the head section are assembled as shown. These apertures are adapted to permit drainage of moisture that may become entrapped within the reservoir thus preventing accumulation of rust producing deposits of water when the reservoir is in service.

Another feature of my invention will be apparent in the simple and economical method of manufacture which may be employed in the production of the reservoir having an integral backing strip or flange formed on the head section. Referring again to Fig. 1 I propose to form the backing strip on the cylindrical portion 7 of the head section by means of dies operated in a hydraulic press of suitable construction. Inasmuch as the hydraulic press is well known in the art, the press and the dies employed in the various operations in the process of forming the backing strip have not been illustrated in the drawing but the method of manufacture will be clearly understandable from the following brief description.

In the first step in the operation of forming the inwardly inclined backing flange 12 the head section 6 is clamped between a pair of die members after which a third die member having an inclined interior surface is pressed against the lower edge of the cylindrical skirt portion 7 to form an initial taper thereon. In the second operation, the reservoir head section having the initial taper is clamped over an interior die member having an enlarged head portion after which another die member having a sharp annular edge is brought upwardly against the tapered portion of the head 6 to form the annular shoulder 14. While the last mentioned die member is still in place, the interior die member having the enlarged head portion is then withdrawn, so that the enlarged head portion thereof is caused to spread the tapered flange 12 outwardly against the exterior die member to form the surface 15 on the head section 6. The final operation consists in the punching or drilling of the apertures 16 in the portion of the inwardly inclined flange 12 beyond the surface 15.

When the reservoir head section 6 and the cylindrical shell section 5 are assembled, the tapered backing strip or flange 12 serves as a guide facilitating the fitting of the surfaces 9 and 10, on the shell section, into engagement with the complementary surfaces 14 and 15, on the head section. It will be understood that the portion of the inclined flange 12 including the surface 15 thus serves as a backing strip that is necessary to permit exterior welding of the two reservoir sections. The assembled head section 6 and shell section 5 may then be butt-welded along the line of contact by the carbon arc process, forming an external weld as indicated at 18 in Fig. 2.

From the foregoing description, it will be apparent that my invention provides an improved reservoir having features of construction that satisfy the requirements of approved engineering standards, comprising means for securing the reservoir head section to the shell section thereof by a single external weld, thus providing a welded joint having both strength and neat appearance, while avoiding any necessity for providing an additional internal weld or a separate backing piece of steel.

Having now described my invention, what I claim as new and desire to secure by Letters Patent, is:

1. A fluid pressure reservoir formed of thin sheet steel and comprising at least one dome-shaped head section having a cylindrical wall, said wall terminating in an inwardly inclined annular backing flange having a right angular exterior shoulder formed thereon and providing a flat surface of the same diameter as that of said cylindrical wall, the inner portion of said backing strip having a plurality of drainage apertures formed adjacent said shoulder, and a cylindrical shell section having the same diameter as that of said head section, said shell section being seated on said shoulder outwardly of said backing strip and being welded exteriorly to said head section along the line of contact.

2. A fluid pressure reservoir formed of thin sheet metal and comprising at least one dome-shaped head section having a cylindrical wall, said wall terminating in an inwardly bent annular flange, said flange having a right angular V-shaped recess formed circumferentially around the outer margin thereof which is of the same diameter as that of said cylindrical wall, drainage means formed in the portion of said flange inwardly of said recess, and a cylindrical shell section having the same diameter as that of said cylindrical wall, said shell section being fitted into said annular recess adjacent said flange and butt-welded to said head section by means of an exterior weld along the line of contact, whereby said inwardly flared flange constitutes an integral backing strip supporting said butt weld.

3. In a storage reservoir of the unfired pressure vessel class, the combination with a cylindrical shell section made of relatively thin sheet steel and having a flat edge surface formed perpendicularly of the axis thereof, of a head section formed of sheet steel of the same thickness as that of the shell section, said head section having a cylindrical skirt the marginal portion of which is crimped inwardly and upset, providing an annular square shoulder complementary to said edge surface of the shell section, said marginal portion of the skirt terminating in an inwardly tapered flange adapted to engage and to underlie the end of said shell section when said parts are assembled, said flange having formed therein a plurality of drainage apertures adjacent the junction of said shoulder and edge surface, and a single external fusion weld uniting said shell and head sections and fused at said junction to a depth equal to at least the thickness of the sheet steel of said shell section.

STUART B. BRODIE.